United States Patent [19]
Chou et al.

[11] Patent Number: 6,035,289
[45] Date of Patent: Mar. 7, 2000

[54] METHOD AND APPARATUS FOR ELECTRONIC TRADING OF CARRIER CARGO CAPACITY

[75] Inventors: Yu-Li Chou; Amit Garg, both of White Plains; James Tien-Cheng Yeh, Katonah, all of N.Y.

[73] Assignee: International Business Machines Corporation, Armonk, N.Y.

[21] Appl. No.: 09/115,450

[22] Filed: Jul. 14, 1998

[51] Int. Cl.[7] .................................................. G06F 17/60
[52] U.S. Cl. .............................. 705/37; 705/35; 705/36; 709/214
[58] Field of Search ................................ 705/37, 36, 35; 709/213

[56] References Cited

U.S. PATENT DOCUMENTS

| | | | |
|---|---|---|---|
| 4,412,287 | 10/1983 | Braddock, III | 705/37 |
| 4,903,201 | 2/1990 | Wagner | 705/37 |
| 5,136,501 | 8/1992 | Silverman et al. | 705/37 |
| 5,715,402 | 2/1998 | Popolo | 705/37 |
| 5,727,165 | 3/1998 | Ordish et al. | 705/37 |
| 5,835,716 | 11/1998 | Hunt et al. | 709/213 |
| 5,845,266 | 12/1998 | Lupien et al. | 705/37 |
| 5,890,138 | 3/1999 | Godin et al. | 705/26 |
| 5,905,975 | 5/1999 | Ausubel | 705/37 |
| 5,950,176 | 9/1999 | Keiser et al. | 705/37 |
| 5,950,177 | 9/1999 | Lupien et al. | 705/37 |
| 5,950,178 | 9/1999 | Borgato | 705/37 |

OTHER PUBLICATIONS

'Wal–Mart Streamlijnes Transportation Bidding Process with the SABRE Froup's Decision–Support Software; Wal–Mart Realizes Multimillion Dollar Savings With Opti-Bid', PR Newswire, p825DAW033, Aug. 25, 1998.

Burke, Gibbons, '*Reuters interruptus*: GLOBEX test suffers setback. (electronic trading system)', Futures (Cedar Falls, Iowa), v21, n5, p.12 (1), Apr. 1992.

Stedman, Craig, 'Shipping service keeps users truckin', Computerworld, p. 39 & 41, Jun. 24,1996.

*Primary Examiner*—Allen R. MacDonald
*Assistant Examiner*—Akiba Robinson-Boyce
*Attorney, Agent, or Firm*—Whitman, Curtis & Whitham; Stephen C. Kaufman

[57] ABSTRACT

A computer-implemented method for double auction trade-building by matching, based on feasibility and price/cost heuristics, a plurality of electronically posted bid with a plurality of electronically posted ask records. A one-pass sequential trade building method selects ask records one at a time and sequentially inserts, in one pass, as many of the bid records as possible while maintaining feasibility criteria. A two pass sequential trade building method inserts the bid records in two stages, the first terminating when the trade becomes feasible and the second when no further bids can be inserted.

8 Claims, 4 Drawing Sheets

METHOD AND APPARATUS FOR ELECTRONIC TRADING OF CARRIER CARGO CAPACITY

BACKGROUND OF THE INVENTION

1. Field of the Invention

The present invention generally relates to a computer-based method and apparatus for trading cargo capacity and, more particularly, to a method and apparatus for receipt of electronically posted bids and asks for carrier services, and for an optimized route building matching thereof.

2. Description of the Related Art

It is probable that commercial shippers and arbitrageurs frequently search the market, to some degree or extent, to find the lowest cost commercial carriers while, on the other hand, commercial carriers will shop their services to the commercial shippers who pay the highest prices. It is further believed, however, that the market search and shopping of services will frequently entail a high and repetitive search cost. In addition, due to the probable limitations of the known types of market search and shopping methods used by general commercial shippers and carriers, it is believed that many shippers and carriers will commonly limit the search to a preferred set of providers of the others' goods or services. Therefore, it is likely that commercial shippers frequently do not obtain the lowest price carrier and, similarly, commercial carriers do not always obtain the highest available prices for their services.

Accordingly, it is believed that many commercial shippers and carriers, being limited in their ability to conduct market-wide searches to find the best prices for their services and orders, will likely employ alternative means to lower their costs and increase their revenues. For example, it is believed that many carriers, after receiving what is subjectively a sufficient number of orders from their usual shipping customers, will attempt to optimize their routing and fleet utilization to execute all of the requested shipping tasks with minimal cost. Similarly, it is believed that commercial shippers will attempt to optimize their distribution and schedule of shipping orders before presenting those orders to the few preferred carriers.

It is likely, however, that these alternative cost reduction methods are generally sub-optimal due, in large part, to the limited scope and limited refresh rate for the information available to each of the shipping and carrier entities. Therefore, it is likely that commercial shippers and receivers neither receive the best prices for their orders and services, nor obtain optimal benefit from their alternative cost reduction methods.

Electronic commerce, on the other hand, of goods and services traded over the internet, including airline tickets, books, music compact discs (CDS) and advertising bulletin boards, has been doubling in volume every year for the last few years. This is based on available surveys, such as Electronic Commerce Survey, The Economist, May 10, 1997.

The electronically traded goods identified above, however, are generally traded as simple fixed offer and acceptance sales, i.e., one party offers the goods or services for a publicized price, and the other party steps forward and accepts the goods or services at that offered price.

The present inventors have identified that commercial shipping and commercial carrier services are not practical or desirable for trading using fixed publically-posted offers or bids. The reasons are manifold. However, an example reason is that the shippers and carriers may not wish their asking prices for their respective goods or services to be known to their competitors. In addition, a large number of descriptors are required to define a particular shipping requirement or a particular carrier route being offered. Further, commercial shipping entities require short-notice response to immediate and sometimes non-recurring shipping needs, which makes fixed offers impractical. Still further, the availability of commercial carriers' routes, i.e., the supply, is sporadic and, coupled with the rapid fluctuations in demand from the shippers, creates rapidly changing supply-demand driven market prices. Existing electronic trading schemes do not meet these requirements.

For these and other reasons, it is believed that commercial shippers and carriers, and related entities such as transportation brokers and arbitrageurs, are not presently making substantial use of a mass electronic information exchange network, such as the internet, for posting, marketing and trading their respective goods and services. It will be understood that directed point-to-point communications, such as confirmations of receipt of goods, and specifically addressed requests-for-quotes, although transmitted by e-mail and the like, are not considered as a "use of the internet" for purposes of this description.

SUMMARY OF THE INVENTION

It is an object of this invention to provide an efficient computer-implemented central clearinghouse system and method for receiving plurality of bids and asks from a plurality of participating cargo transportation entities such as shippers, carriers, transportation brokers, third party logistics providers and arbitrageurs, and for matching these into optimized trades.

It is another object of this invention to utilize the general and presently increasing access to, and the high rate information transfer capacity of, the internet to increase revenues and decrease costs for the participants far beyond what is available using present manual search and shop methods.

It is another object of this invention to provide a computer based method for participants, such as shippers and carriers, to post their respective bids and asks and for matching these bids and asks in an optimal manner, while incurring negligible search costs.

It is still another objective of this invention to provide a computer based method for receiving bids and asks from a plurality of participants and for matching these according to method steps which may allow improved fleet utilizations and, hence, lower average costs and higher average profits for the participants.

It is another objective of this invention to provide a computer based method for receiving bids and asks from a plurality of participants and for matching these according to method steps which, due to the method steps' objective matching criteria, may allow a more rapid adjustment of the ranges of services offered, and of the ask and bid prices, to ranges and values more optimally corresponding to the supply and demand of the current market.

An embodiment of the computer-implemented method of this invention receives, by electronic media, one or more asks from each of a plurality of carrier entities, and one or bids from each of a plurality of shipping entities. Each of the asks and bids are stored as a record in a general purpose programmable digital computer. Each ask record includes a data representing an available cargo capacity, an origin of shipment, an offered departure time window, an offered shipment destination, an offered destination arrival time window, and an ask price. Similarly, each bid record includes data representing a certain volume or weight of goods that need to be transported, a required shipping origin, a required shipping destination, a required departure time window, a required arrival time window, and a bid price. For ease of description, the terms "ask record" and "ask" are used interchangeably, as are the terms "bid record" and "bid."

The method then performs a double auction bid-ask matching, also called "trade-building", step which iteratively matches the bids to the asks to obtain a maximum number of matches, based on a plurality of matching constraints. The matching constraints are based on the bid and ask records' respective shipping origins and shipping destinations, time windows, available cargo capacities, required volume or weight of goods, and ask and bid prices.

The trade-building step employs a constraint-driven matching and route building process which solves a Pickup and Delivery Problem with Time Windows (PDPTW). As will understood from the detailed description below, the PDPTW problem is NP-hard and, therefore, the trade-building step solves an NP-hard problem as well. The trade-building step therefore employs heuristics to match the bids and asks, as will be described.

Two embodiments of the trade-building or bid-ask matching step are described. Both embodiments employ a sequential route building approach, which build routes, if possible, one at a time for each of the received asks until the ask meets a predetermined cost criteria or until no further bids can be inserted.

The first embodiment of the invention is called the one-pass sequential trade building method and includes the following steps:

First, an ask ordering step arranges the asks in ascending order based on their prices and initializes all of the bids as unmatched bids. An ask selection step selects the ask record having the highest ask priority, i.e., the lowest price, from all unmatched asks. A trade route initializing step initializes a trade route data list corresponding to the selected ask. The trade route, after construction by this method, will have a route origin node, a route destination node, and a plurality of intermediate route nodes. Each ask's initial trade route therefore has a route origin node and a route destination node corresponding to the shipping origin and the shipping arrival data of that ask record.

A first bid selection step selects a sub-plurality of bids from the plurality of unmatched bids, based on a time feasibility criterion and a capacity feasibility criterion. The time feasibility criterion is whether the bid's departure and arrival time windows can be met while meeting the arrival/ departure time windows of subsequent nodes in the route. The capacity feasibility criterion is whether the bids shipping load can be accommodated while still accommodating the shipping loads of the arrival/departures of all other nodes in the route.

A second bid selection step selects as a candidate bid the bid from the time and capacity qualified sub-plurality that provides the maximum increase in the price ratio of the route. The increase in price ratio is therefore the selection heuristic for this method. The price ratio of the route is the total price of all bids in the trade route to the total cost of the route. The total cost of the route is, for one example, based on the total geographical distance of the route divided by the ask price. For the described examples, a trade is called "price feasible" if the price ratio is greater than or equal to "1".

A bid insertion and route completion step compares the price feasibility of the route before and after an insertion of the candidate bid. If the comparison shows that the route had been price infeasible before the insertion, but remains price infeasible after the insertion, the candidate bid is inserted. Also, if the comparison shows the route had been price feasible before the insertion, and remains price feasible after the insertion, the candidate bid is inserted. If the candidate bid is inserted it is removed from the list of unmatched bids. If the comparison shows that the route had been price feasible before the insertion, but would become price infeasible if the candidate were inserted, the trade route is designated as completed. This method repeats the first and second bid selection steps, and the bid insertion and route completion step until the trade route is designated as completed or until there are no further bids which qualify for insertion, whichever occurs first. If the route is not price feasible after insertion of all time and capacity qualified bids it is designated as non-executable, and all bids that had been inserted into it are made available for matching with the next ask. The method then selects the next highest priority ask and repeats the steps of selecting a sub-plurality of unmatched bids meeting time and capacity feasibility, and selecting a candidate from that sub-plurality which best improves the price ratio, and inserting the candidate bid until the trade is completed or the bids are exhausted. The method is then completed by posting all of the executable trades.

The second embodiment employs a two-pass sequential trade building method or 2-PSTB, and differs from the first by having two stages. The first stage is substantially the same as the first sequential method, except that the constructing of a trade is completed upon the first bid insertion that renders the trade route price feasible. These are termed "basic trades." Unlike the first sequential method, the basic trade is not constructed to the point where the next candidate bid, if inserted, would render it price infeasible. The second stage then selects the basic trades one at a time and, in a manner similar to the first sequential trade building method, performs a first and second bid selection step to select a candidate bid, inserts the candidate bid if it is price feasible, and repeats the sequence until the next candidate bid, if inserted, would render the trade price infeasible.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
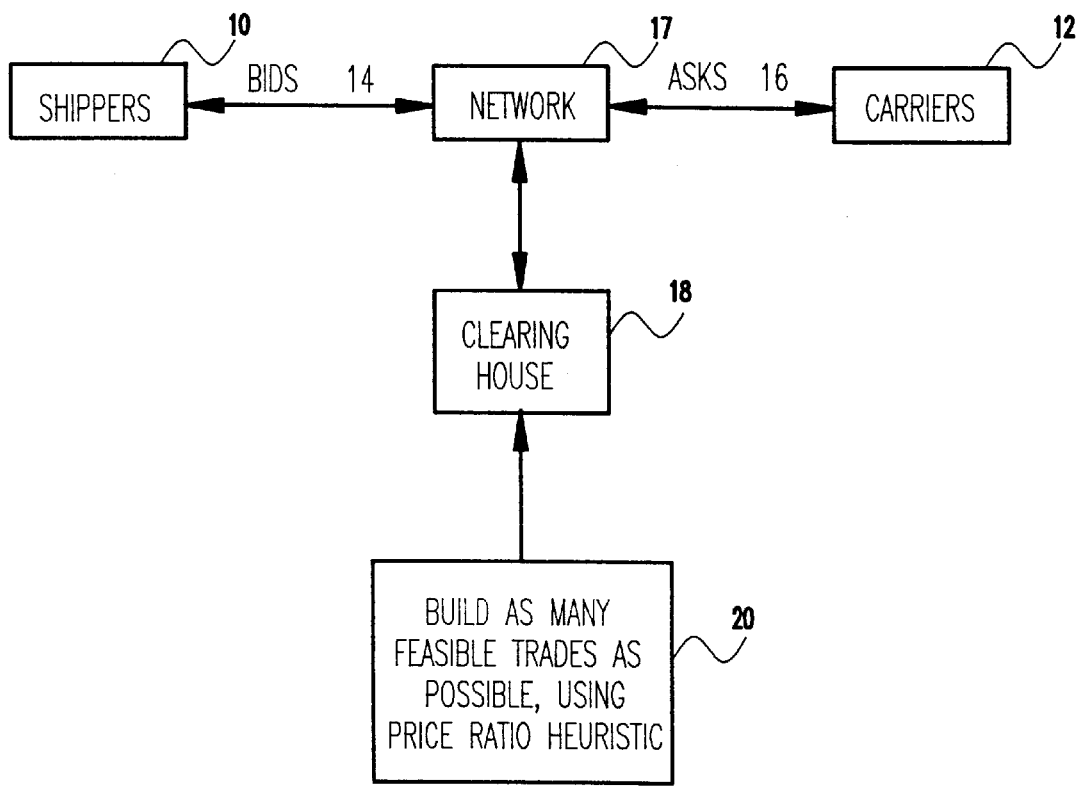
FIG. 1 is a high level diagram of a double auction system and method according to the present invention.

The computer implemented method of the present invention receives electronically posted bids -and electronically posted asks from a plurality of commercial cargo transportation entities, termed "participants" for this description, and then carries out by computer implementation a double auction type trade building, which is a parameter-based, heuristically-driven, matching of each ask to as many bids as possible, using a priority based selection for which ask is selected first and for what order the bids are selected for matching with the asks. For purposes of this description, it will be assumed that participant carrier entities post bids and participant shipping entities post asks. This assumption, however, is for descriptive purposes only and is not limitative. Other contemplated participants include transportation brokers, third party logistic providers and arbitrageurs. The carrier entities include, for example, fleet trucking companies, railroads, cargo air fleet companies, and cargo ship lines. The shipping entities include, for example, manufacturers and wholesale goods suppliers.

The present invention employs, in part, a substantial and novel modification of the bid-ask double auction used in many financial markets, such as the New York Stock Exchange (NYSE). Many variations of the double auction are known in the relevant arts. The variation that relates closest to this described example of the invention is the discrete-time doqble auction. The mathematical theory and methods for modeling the discrete-time double auction are well-known in the relevant art, and are described in the available treatises. A further description of the discrete-time double auction is not necessary for an understanding of this invention. An interested reader, however, can refer, for example, to Friedman et al., The Double Auction Market Institutions, Theories, and Evidence, Addison-Wesley, Reading, Mass., 1993.

In the present invention, the shipper's "goods", as represented by the electronic data record of the shipper's posted bid, consist of shipping requirement, defined by the cargo that the shipper requires to be shipped from an origin (or city) A to a destination (or city) B, the required arrival and departure time windows, the weight and volume of the cargo, the transportation mode, and the price that the shipper will pay. The carrier's goods, as represented by the electronic data record of the carriers posted offer, termed an "ask", are the offered cargo service, defined by the origin and destination places (or cities), the departure and arrival time windows, the transportation mode, the available cargo capacity, and the minimum price the carrier will accept.

It is seen that the offered shipping and carrier goods are significantly more complex, in terms of the attributes that constrain their matches to one another, than are goods definable by price only, such as stocks sold on the NYSE. The present inventors have, however, identified the following attributes of bids and asks as sufficient for a practical example implementation of the invention:

Bid Attributes, i.e., what the buyer (the shipper) specifies for the cargo capacity he wants to buy:

Quantity to be shipped, expressed, for example as a number of containers or a number of truckloads;

Origin-destination pair for the cargo;

Transportation mode, such as, for example, air freight, rail;

Departure time window;

Arrival time window; and

Bid price per unit load.

Ask Attributes, i.e., what the seller (the carrier) specifies for the cargo capacity he or she wants to sell:

Capacity available, expressed, for example, as a number of containers or truckloads;

Origin-destination pair for the capacity;

Transportation mode, such as, for example, air freight, rail;

Departure time window;

Arrival time window; and

Ask price per unit load, per mile traveled in the route.

The above-listed attributes are for purposes of example only. The described method, for example, will be readily understood by one of ordinary skill as to be modifiable to incorporate additional bid attributes such as total allowable elapsed time, number of stops, special cargo handling requirements such as refrigeration or fragile goods protection measures, and other goods specifiers, such as liquid goods (requiring tanker trucks or tanker rail cars). In addition, a bid attribute which specifies the mode of transportation can have multiple alternative entries, such rail or truck.

The described method can be readily modified to provide more elaborate ask pricing structures, incorporating, for example, the elapsed time and number of stops. For purposes of this description, however, the ask pricing is based only on the distance traveled and the capacity available.

The present method's set of defined attributes are chosen to provide substantial flexibility in matching bids and asks, to meet practical requirements, without unnecessary complexity. For example, the specific route that the carrier takes is generally of little consequence, to either the carrier or the shipper, so long as the cargo departs from its required origin, reaches its required destination, adheres to specified arrival and departure time windows, and the carrier is paid based on the distance traveled. Constraints on the bid, on the other hand, are much tighter because they represent loads that must be delivered from an origin to a destination within specified departure and arrival time windows.

Referring to FIG. 1, a high level operation of a of the present invention is as follows:

A plurality of shippers 10 and a plurality of carriers 12 each place one more orders or offers, termed bids 14 and asks 16, respectively, through an electronic network 17, to a clearinghouse 18. The placement is done via, for example, the shippers 10 and carriers 12 visiting and making entries into the clearinghouse's web site (not shown), or by direct e-mail to the clearinghouse, or over the phone, or through intermediaries such as brokers.

The clearinghouse 18 collects the bids 14 and asks 16 and, at periodic intervals, matches them at block 20 into a set of "trades", defined in detail below, by a method that models the priorities and objectives of a double auction. It is envisioned that each shipper 10 and each carrier 12 can only view and change the orders and the specifications (termed herein as "attributes") of orders which that entity itself placed.

A first and a second implementation of the matching or "trade building" operation of block 20 are described below. The first is the one-pass sequential trade building method, or 1-PSTB, and is described in reference to FIG. 2, and the second of the two-pass sequential trade building method, or 2-PSTB, which is FIGS. 3A and 3B.

At the end of the auction, the clearinghouse 18 posts the results in the form (not shown) of route schedules for the carriers, and the set (not shown) of shippers that have been assigned to a route.

For consistency, the following notations and definitions of variables are used for the remainder of this description:

A, indexed by j, is defined as the set of all asks,

B, indexed by i, is defined as the set of all bids, $q_i$ represents the load quantity demanded to be transported by the $i^{th}$ bid, $b_i$ represents the given $i^{th}$ bid price for transporting the entire shipment, $O_i$ represents the pickup node demanded by the $i^{th}$ bid, $D_i$ represents the delivery node demanded by the $i^{th}$ bid, $[\underline{\delta}_i, \overline{\delta}_i]$ represents the pickup time window demanded by the $i^{th}$ bid, and $[\underline{\alpha}_i, \overline{\alpha}_i]$ represents the delivery time window demanded by the $i_{th}$ bid, $\overline{q}_j$ represents the total available cargo capacity for the $j^{th}$ ask, $O_j$ represents the starting location or node for the $j^{th}$ ask's cargo capacity, $D_j$ represents the ending destination or node for the $j^{th}$ ask's cargo capacity, $[\underline{\delta}_j, \overline{\delta}_j]$ represents the departure time window for the $j^{th}$ ask's cargo capacity from its starting location, $[\underline{\alpha}_j, \overline{\alpha}_j]$ represents the arrival time window for the $j^{th}$ ask's cargo capacity at its ending location, and $a_j$ represents the ask price in terms of dollars, or other unit of currency, per-unit-load-per-unit mileage, or other measure for distance. The ask price $a_j$ therefore differs from the bi bid price, which is in dollars or another unit of currency.

As will be seen from the description below, the minimum price acceptable for matching with an ask depends on the route the cargo is assigned to travel, and will be calculated, for the described example, by multiplying the ask price by the required traveling distance and the total available cargo capacity.

As will be further seen from the description below, the method constructs or "builds" a trade as it matches bids to each of the asks. The notation used for characterizing the trades is as follows:

(N,E) is a data pair representing the entire network, or universe of nodes, where $N = \{O_k \cup D_k | k \in A \cup B\}$ is the set of all nodes, and $E \subseteq N \times N$ is a set of feasible arcs from each node in N to each other node in N.

Each arc is denoted by arc(l,n), where (l,n) ∈ N, and arc(l,n) ∈ E.

$t_{ln}$ and $d_{ln}$ represent, for each arc (l,n) the travel time and the travel distance, respectively from node l to node n. For this description, $t_{ll}=0$ and $d_{ll}=0$, for all l ∈ N.

There are five types of decision variables used by the computer implementation of the present method, representing arrival/departure time and capacity values, bid and ask matching status. For purposes of this example description, these are labeled and defined as follows:

$X_{ln}^j$ is the first type of decision variable and is termed the flow variable, for l,n ∈ N, and j ∈ A, and is defined as:

$$X_{ln}^j = \begin{cases} 1, & \text{if ask } j\text{'s route contains } arc(l,n) \in E, \\ 0, & \text{otherwise} \end{cases}$$

$Z_{ij}$ is the second type of decision variable and is termed the bid matching variable. $Z_{ij}$ is defined as:

$$Z_{ij} = \begin{cases} 1, & \text{if bid } i \text{ assigned with ask } j, \\ 0, & \text{otherwise} \end{cases}$$

$V_j$ is the third type of decision variable, termed the ask matching variable, and is defined as:

$$V_j = \begin{cases} 1, & \text{if ask } j \text{ is assigned with at least one bid,} \\ 0, & \text{otherwise} \end{cases}$$

$T_l^j$ is the fourth type of decision variable and represents the time at which service at node l in the route of ask j begin. For purposes of this description it is assumed that the service time is zero. Therefore, $T_l^j$ is also the departure time from node l.

$T_{O_j}^j$ is the method variable representing the departure time of the cargo capacity of ask j from its starting location $O_j$.

$T_{D_j}^j$ is the method variable represents the arrival time of the cargo capacity of ask j at its ending location $D_j$.

$Y_l^j$ is the fifth type of decision variable and is the method variable representing the total available cargo capacity in ask j immediately after departure from node l, for all nodes l ∈ N. It can be readily seen that $Y_{O_j}^j = q_{j'} = q_j$.

The described implementations of the invention include some underlying assumptions, based on general practicalities of the shipping industry and which minimize undue complication of the description with modeled occurrences that will never happen. In addition, these assumptions will facilitate a ready understanding the novel features of the invention by one of ordinary skill in the art. The first general assumption is that a carrier vehicle, meaning a truck, rail car, airplane or ship, waits if it arrives at a node before the earliest possible time for performing the next pickup or delivery task in the route. Arrival after the latest possible time, however, is not allowed. The second assumption is that each bid can be assigned at most to one ask. This implies, at least for the described examples of this method, that bid loads cannot be split between several asks. Thirdly, it is assumed that all of the capacity of a particular ask j has the same route and schedule. In other words, an ask cannot consist of a given capacity that is split among multiple routes and schedules. Therefore, for this description, a reference to "route j" means the route and the schedule of the cargo capacity in ask j. Another assumption is that matches for bids and asks are an all or nothing state. Additional constraints and assumptions will be stated where appropriate.

The computer-implemented method of this invention, in its operation, effects a double-auction matching of bids and asks in theoretical accordance with Equation (1) and its constraints (2)–(19), below:

$$\max \sum_{j \in A} \sum_{i \in B} Z_{ij} + \sum_{j \in A} V_j \quad (1)$$

$$\sum_{j \in A} \sum_{n \in N} X_{O_i n}^j \leq 1 \quad i \in B \quad (2)$$

$$\sum_{i \in B} X_{O_j O_i}^j \leq 1 \quad j \in A \quad (3)$$

$$\sum_{i \in B} X_{D_i D_j}^j \leq 1 \quad j \in A \quad (4)$$

$$\sum_{n \in N} X_{kn}^j - \sum_{n \in N} X_{nk}^j = 0 \quad k \in \{O_i \cup D_i | i \in B\} j \in B \quad (5)$$

-continued $$\sum_{n \in N} X_{O_i n}^j - \sum_{n \in N} X_{n D_i}^j = 0 \quad i \in B, j \in A, \tag{6}$$

$$T_{O_i}^j + t_{O_i D_i} \leq T_{D_i} \quad i \in B, j \in A, \tag{7}$$

$$X_{\ln}^j (T_l^t + t_{\ln} - T_n^j) \leq 0, l, n \in N, j \in A, \tag{8}$$

$$X_{O_j O_i}^j (T_{O_j}^j + t_{O_j O_i} - T_{O_i}^j) \leq 0, i \in B, j \in A, \tag{9}$$

$$X_{D_j D_j}^j (T_{D_i}^j + t_{D_i D_j} - T_{D_j}^j) \leq 0, i \in B, j \in A, \tag{10}$$

$$\underline{\delta}_{O_k} \leq T_{O_k}^j \leq \overline{\delta}_{O_k}, k \in A \cup B, \tag{11}$$

$$\underline{\alpha}_{D_k} \leq T_{D_k}^j \leq \overline{\alpha}_{D_k}, k \in A \cup B, \tag{12}$$

$$X_{n O_i}^j (Y_n^j - q_i - Y_{O_i}^j) = 0, n \in N, i \in B, j \in A, \tag{13}$$

$$X_{n D_i}^j (Y_n^j - q_i - Y_{D_i}^j) = 0, n \in N, i \in B, j \in A, \tag{14}$$

$$Y_{O_j}^j = \overline{q}_j, j \in A, \tag{15}$$

$$Y_n^j = \overline{q}_j, n \in N, j \in A, \tag{16}$$

$$\sum_{i \in B} b_i Z_{ij} \geq a_j \overline{q}_j \sum_{i \in N} \sum_{n \in N} d_{\ln} X_{\ln}^j, j \in A, \tag{17}$$

$$Z_{ij} = \sum_{n \in N} X_{n O_i}^j, i \in B, j \in A, \tag{18}$$

$$V_j \geq Z_{ij}, i \in B, j \in A, \tag{19}$$

$$X_{\ln}^j, Z_{ij}, V_j \in \{0, 1\}l, n \in N, i \in B, j \in A. \tag{20}$$

Equation (20) defines X, Z and V as being binary variables.

As will understood from the description below, the objective of the present invention is to maximize the total number of bids i and asks j that are successfully matched. Method steps representable in operation by equations, or constraints, (2)–(19) above are carried out to achieve this objective. The general function of these constraints is as follows:

Constraints (2)–(5) form a what is termed a multi-commodity flow problem. Constraint (6) is termed a coupling constraint, which assures that a shipment will be picked up and delivered in the same route.

Constraints (7)–(10) are termed "precedence relationships", and these specify the conditions that must be met before for a corresponding action can be taken. More specifically, equations (7)–(10) establish that a shipment must picked up before it can be delivered; that the first node in a generated route is the starting location of the ask j; and that the last node in the generated route is the ending location of the ask j.

Constraints (11) and (12) are termed "time window feasibility constraints," which define the time window requirements that must be met before a bid i, selected for matching a $j^{th}$ ask, will be inserted into the method's route that it constructs for that $j^{th}$ ask, as described below.

Constraints (13)–(16) are termed "cargo capacity feasibility constraints," which, in a similar manner to the time window feasibility constraints above, define the cargo capacity feasibility requirements that must be met before a bid i, selected for matching a $j^{th}$ ask, will be inserted into the method's route that it constructs for that $j^{th}$ ask, as described below.

Constraint (17) is termed the price constraint, and is used by the present method, as test for insertion of a bid i into the route for ask j, to ensure that the total bid price collected from a trade is greater than or equal to the total asking price.

Constraint (18) is termed the matching constraint for the bids and asks. Constraint (19) which is termed the assignment constraint, is used to limit the matching of a bid to an executed ask only.

Equations (2)–(15) form a PDPTW routing and scheduling sub-problem. It is well-known to one of ordinary skill in the art that PDPTW is an NP-hard problem. Therefore, effective heuristics will be described, to enable this method to solve large problems in a reasonable amount of time using commercially available programmable computers.

For this description, $\beta_j = \{i_1, \ldots, i_k\}$ references a data array, list, or vector representing the list of bids i matched to ask j during execution of this method, and is termed herein as a "trade for ask j" or, more simply, a "trade";

$R(\beta_j) = (n_0, n_1, \ldots, n_r)$ references a data array, list or vector representing an ordered set defining the corresponding route that satisfies all requested shipments from bids in $\beta_j$ where $n_0 = O_j$ and $n_r = D_j$;

$B^u \subseteq B$ references a data array, list, or vector representing the set of unmatched bids, $c(\beta_j)$ references a computer variable representing the total of the bid price. and the ask trade revenue, $y(\beta_j)$ references a computer variable representing the total ask price or the "ask trade revenue."

The total bid price, $c(\beta_j)$ and the ask trade revenue, $y(\beta_j)$, will be expressed, for this example description, as:

$$c(\beta_j) = a_j q_i \sum_{r=0}^{l-1} d_{n_r n_{r+1}}, \tag{21}$$

$$y(\beta_j) = \sum_{r=1}^{l-1} b_r \tag{22}$$

A trade $\beta_j$ is identified as "executable" if the following three conditions are met:

$R(\beta_j)$ is time-window feasible, $R(\beta_j)$ is capacity feasible, and $\beta_j$ is price feasible, i.e., $y(\beta_j) \geq c(\beta_j)$.

I. One-Pass Sequential Trade Building Method

Figure 2:
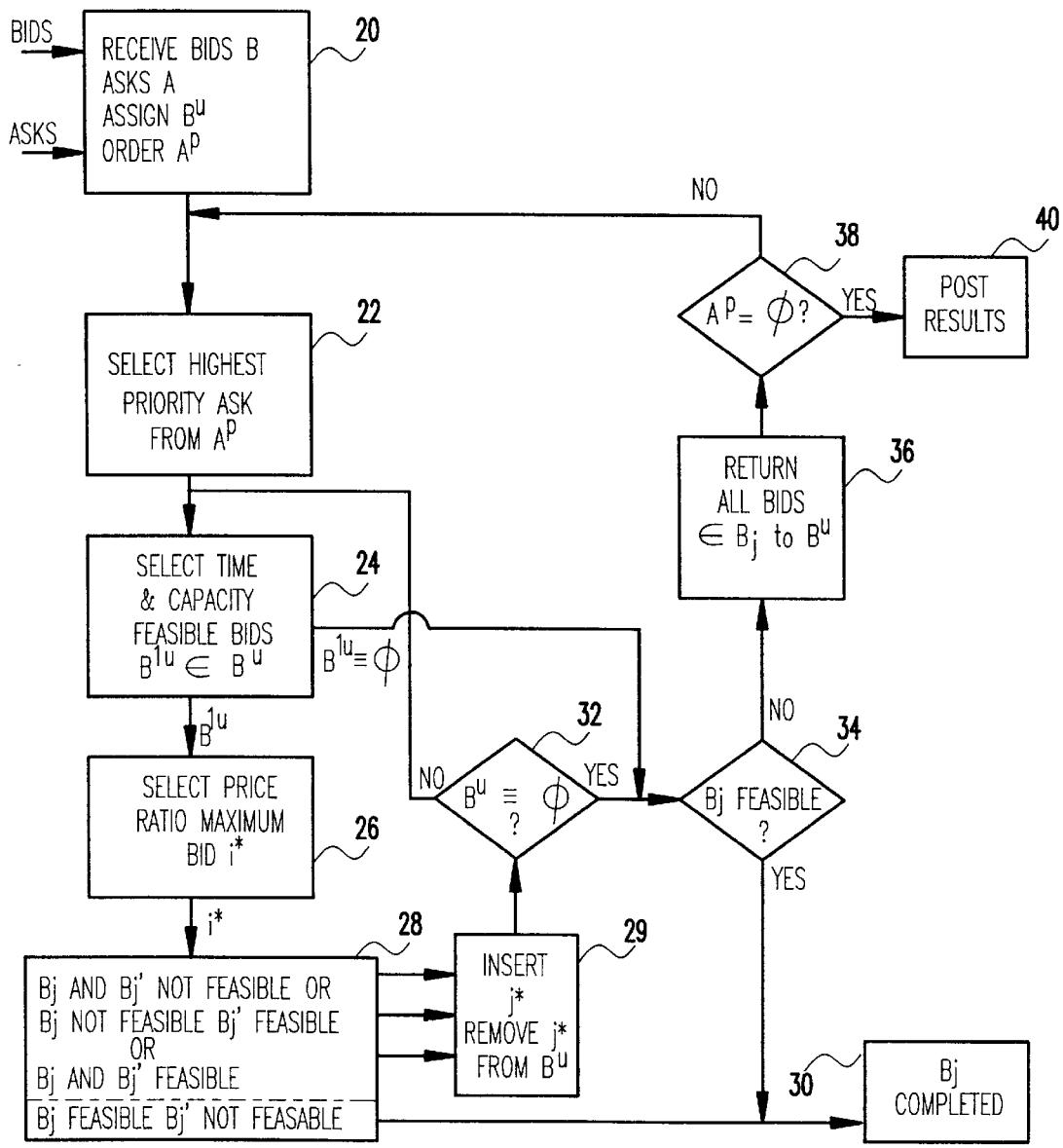
FIG. 2 is a functional block diagram of a one-pass sequential trade building method according to the present method.

Referring to FIG. 2 the first embodiment of this invention, termed herein as the "one-pass sequential trade building method" or "1-PSTB", will be described. First, block 20 first arranges the asks j in the ascending order of their prices, which are indicated by the price field (not shown) within the bit allocation format (not shown) of the received electronic ask order. The ordered set of asks is referenced as $A^p$. Block 20 also assigns all of the received bids to the set labeled $B^u$, which is the set of bids that have not been matched with an ask.

Block 22 then selects the highest priority ask j from the ordered set of asks $A^p$. For the first iteration through blocks 22 and 24, the above-defined decision variable $V_j$="0", since that ask has not yet been matched with a bid i. Therefore, assuming that the highest priority ask has a j index value of "1", $V_1$="0" for the first iteration through blocks 22 and 24.

Blocks 24 then tests each of the bids i in the plurality of unmatched bids $B^u$ to determine if it is time window feasible and capacity feasible to insert it into the trade $\beta_j$. The result is a sub-plurality of time window and capacity feasible bids, termed $B'''$. If $B'''$ is empty, i.e., block 24 cannot identify any bids meeting the time window and capacity feasible requirements for insertion, the construction of the trade $\beta_j$ cannot proceed any further, and the process goes to step 36, described below, to determine if the trade $\beta_j$ is price feasible.

At this stage any of the bids belonging to $B'''$ that result in price-feasible trades will imply executable trades. Therefore the terms price-feasible and executable are, at this stage, interchangeable.

If $B'''$ is not empty, the process goes to block 26 which identifies from $B'''$ a candidate bid, labeled herein as i*, for insertion into the trade $\beta_j$. The bid i* is selected as the bid that would provide the maximum increase in the constructing trade $\beta_j$ price ratio $y(\beta_j)/c(\beta_j)$ defined above. An example implementation of block 24 is described under "Example Step Determining Capacity Feasibility" and "Example Step of Determining Time Window Feasibility" below. An example implementation of block 26 is described under "Example Detection of Maximum Price Feasibility Bid" below.

Block 26 passes the candidate bid i* to step 28, which determines insertion of the candidate i* into the trade $\beta_j$ and determines completion of the trade. For describing the operation of block 28, the term $\beta'_j$ will refer to the trade $\beta_j$ after insertion of the bid i*.

The operation of block 28 is to compare the price feasibility of the trade $\beta_j$, which is the trade before the insertion of the bid i*, with the price feasibility of the trade $\beta'_j$, which is the trade after the insertion. Price feasibility is defined according to the ratio of $y(\beta_j)/c(\beta_j)$, where $c(\beta_j)$ is the total bid price variable, and $y(\beta_j)$ is the total asking price, or ask trade revenue. If the ratio $y(\beta_j)/c(\beta_j)$ is greater than or equal to "1" the trade is "price feasible" or "executable", as defined above. If the ratio $y(\beta_j)/c(\beta_j)$ is less than "1" the trade is "not price feasible" or "not executable", as defined above.

Therefore, a comparison of the price ratio $y(\beta'_j)/c(B'_j)$ after insertion of the bid i* with the price ratio $y(B_j)/c(B_j)$ of the trade $B_j$ before insertion will yield one of four possible comparative states, which are:

1) both the trade $B_j$ and the trade $B_j$ are not price feasible, i.e., $y(B_j)/c(B_j)<$"1" and $y(B'_j)/c(B'_j)<$"1";
2) the trade $B_j$ was not price feasible but the trade $B'_j$ is price feasible, i.e., $y(B_j)/c(B_j)<$"1" and $y(B'_j)/c(B'_j)>$"1";
3) the trade $B_j$ had been price feasible but the trade $B'_j$ is not price feasible, i.e., $y(B_j)/c(B_j)\geq$"1" and $y(B'_j)/c(B'_j)<$"1"; and
4) both trade $B_j$ and the trade $B'_j$ are price feasible, i.e., $y(B_j)/c(B_j)\geq$"1" and $y(B'_j)/c(B'_j)\geq$"1";

When testing the first bid i* the only possible states are (1) and (2). For any of comparative states (1), (2) and (4) the method proceeds to block 29 which inserts the bid i* into the trade and deletes it from the list of unmatched bids $B''$.

As subsequent bids i* are identified the first occurrence of comparative state (2), if one occurs, will render the trade feasible. Once the trade $B_j$ is executable, each subsequent insertion of a bid i* will either maintain executability, which is comparative state (3), or will render the trade not executable, which is comparative state (4). The objective of this 1-PSTB method is to insert as many bids as possible into the route while still having executability. Accordingly, block 29 will continue to insert bids i*, loop back to block 24, calculate a new set of time and capacity feasible bids $B'''$, proceed to block 26 and identify the next candidate i* from the new set $B'''$, and compare its price feasibility at block 28 until the first occurrence of comparative state (3), or until step 24 finds no more qualified bids $B'''$, whichever occurs first.

If comparative state (3) terminates the loop, the bid i* is not inserted, the process goes to block 30 which identifies the trade $B_j$ as "completed", and then to block 38 to determine if any more asks $A^p$ exist. If the answer is "yes", the process loops back to block 22 to select the next higher priority ask $A^p$.

There are two related conditions by which the bid-inserting loop is terminated by an occurrence other than comparative state (3). One is block 32 detecting no more unmatched bids in the set $B''$. The other is block 24 identifying zero bids from $B''$ which are time window feasible and capacity feasible for insertion into the trade $B_j$, i.e, $B'''\equiv\emptyset$.

If either of these conditions terminate the loop, the method goes to step 34 to determine if trade $B_j$, at its last state, is executable. If the answer is "yes", the process goes to the above-described block 30, identifies the route $B_j$ as "completed", then to block 32 to determine if any more asks $A^p$ exist. If the answer at block 34 is "no", then the ask j cannot be rendered price feasible from the received bids. The process then goes to block 36 which re-assigns to the unmatched bid set $B''$ all of the bids i that had been assigned to that ask j, and then to the above-described block 38 to determine if there are any more asks $A^p$.

If block 32 determines that there are no remaining asks j in $A^p$, the double auction matching process is completed, and the process goes to block 38 and posts the results.

Example Implementation of Block 24 Determination of Capacity Feasibility

Block 24, as stated above, determines the capacity feasibility and time feasibility of inserting the selected bid i into the route j. The definition of capacity feasibility is whether or not route j has sufficient capacity to pick up the cargo demanded by the selected bid i immediately after leaving the node $n_p$, and the capacity demanded by all subsequent nodes already in the route $R(\beta_j)$.

An example implementation of block 24 for generating the capacity feasibility is as follows:

The variable $Y_n^j$, defined above, represents the available cargo capacity on route j immediately before leaving node n, where $n \in R(\beta_j)$. The feasibility condition for route j to pick up the shipment demanded by the bid i inputted to block 26 is to have enough capacity to accommodate the shipment. In other words, $Y_{n_p}^j \geq q_i$. Therefore, delivery is feasible, meaning the bid i is cargo capacity feasible for insertion in route j after node $n_m$, where $m\geq p$, if the capacity to accommodate all subsequent nodes' shipping requirements is met. Using the above-defined variables, block 28 of this method identifies bid i as feasible if $Y_{n_r}^j$, $j\geq q_i$, for $p\leq r\leq m$.

Example Implementation of Block 24 Determination of Time Feasibility

Block 24 also determines time window feasibility of inserting the selected bid i into the route j. The definition of time window feasibility is whether or not the subsequent node pickup/delivery time constraints can be met, of the trade $\beta_j$ after a test insertion of the origin and destination nodes, $O_i$ and $D_i$, respectively, of the selected bid i between nodes $n_p$ and $n_{p-1}$ in route j. An example implementation of block 24 for generating the time window feasibility is as follows:

$w_{n_r}^j$ is assigned as a variable representing the waiting time, i.e., the length of time the carrier arrives at the node before the scheduled time $n_r \in R(\beta_j)$, for $0\leq r\leq 1$.

Every node $n_l$ in the $R(\beta_j)$ route's ordered set represents either a bid or ask origin or a bid or ask destination. Therefore, a unique time window variable, denoted by the ordered pair $[\underline{\lambda}_{n_r}, \overline{\lambda}_{n_r}]$ is associated with every node $n_r$, where $$\lambda_{n_r} = \begin{cases} \underline{\delta}_{n_r}, & \text{if } n_r \text{ is a bid/ask origin,} \\ \underline{\alpha}_{n_r}, & \text{if } n_r \text{ is a bid/ask destination} \end{cases} \quad (23)$$

and $$\overline{\lambda}_{n_r} = \begin{cases} \overline{\delta}_{n_r}, & \text{if } n_r \text{ is a bid/ask origin,} \\ \overline{\alpha}_{n_r}, & \text{if } n_r \text{ is a bid/ask destination} \end{cases} \quad (24)$$

For a route $R(\beta_j)$, the earliest possible service time $s_{n_r}^j$ at node $n_r$ is, for this example, is computed by a step representable by equation (25) below:

$$s_{n_r}^j = \begin{cases} \overline{\delta}_j, & r = 0, \\ \max(\lambda_{n_r}, s_{n_{r-1}}^j + t_{n_{r-1}n_r}), & 0 < r \leq l, \end{cases} \quad (25)$$

and the corresponding waiting time, $w_{n_r}^j$, is computed by a step representable by equation (26) below:

$$w_{n_r}^j = \begin{cases} 0, & r = 0, \\ s_{s_{n_r}}^j - (s_{n_{r-1}}^j + t_{n_{r-1}n_r}), & 0 < r \leq l, \end{cases} \quad (26)$$

Insertion of node $O_i$ between $n_{p-1}$ and $n_p$ may push the currently scheduled service times at nodes subsequent to $n_{p-1}$ in the route ordered list $R(\beta_j)$.

The general definition of time window feasibility is whether the push of the currently scheduled service times will cause any subsequent node arrival time to violate the departure time window from that node. To test this feasibility, the above-defined expressions for $s_{n_r}^j$ and $w_{n_r}^j$ are used to generate $s_{O_i}^j$, $w_{O_i}^j$, and $S_{n_r}^j$, and where $S_{n_r}^j$ is the updated service time at node $n_r$, $r \geq p$.

The variable $P_{n_r}^j$ is assigned to represent the difference between updated, meaning after insertion of bid i, and current schedules. The change in service time in each subsequent node is generated recursively by a step that carries out equation (27) below:

$$P_{n_r}^j = \begin{cases} S_{n_r}^j - s_{n_r}^j, & r = p, \\ \max(\text{zero}, P_{n_r}^j - w_{n_r}^j), & p + 1 \leq r \leq l. \end{cases} \quad (27)$$

Next, for this example implementation of block 28, the time window feasibility is tested against the latest allowable delivery time $\overline{\alpha}_i$ and the maximum value $\overline{\lambda}_{n_r}$ of the service time window $[\underline{\lambda}_{n_r}, \overline{\lambda}_{n_r}]$ for each subsequent node by a step that carries out equations (28) and (29) below:

$$s_{n_{p-1}}^j + t_{n_{p-1}}^j \leq \overline{\alpha}_i \quad (28),$$

and $$s_{n_r}^j + P_{n_r}^j \leq \overline{\lambda}_{n_r} \quad (29)$$

A substantially identical method step is used by block 26 to compute the time window feasibility for the insertion of $D_i$.

Example Implementation of Block 26 Selecting Bid That Maximizes Price Ratio Bid

An example of the block 26 identification of i* is as follows:

Assign the variable $\Delta_i(p,q)$, $i \in B^u$, to represent the change in total asking price if $O_i$ and $D_i$ are inserted after $n_p$ and $n_q$ respectively, where $1 \leq p$, and $p \leq q \leq l$. The representation of either insertion being infeasible is $\infty$. Otherwise, the change in the total asking price is computed by a sub-step step carrying out equation (30) below:

$$\Delta_i(p,q) = \quad (30)$$
$$\begin{cases} c(\beta_j^k) + a_j \overline{q}_j (d_{n_p o_i} + d_{O_i D_i} + d_{D_i n_q+1} - d_{n_p n_p+1}), & p = q \\ c(\beta_j^k) + a_j \overline{q}_j (d_{n_p o_i} + d_{O_i n_{p+1}} - d_{n_p n_{p+1}} + d_{n_p D_i} + d_{D_i n_{q-1}} - d_{n_q n_{q+1}}), & p < q \end{cases}$$

Next, the variable $\Delta_i^*$ is assigned to represent the minimum change in asking price, representable by equation (31) below:

$$\Delta_i^* = \min_{p,q} \Delta_i(p,q) \quad (31)$$

Next, the variable i* is assigned to represent the bid i that maximizes the price ratio, representable by equation (32) below:

$$i^* = \underset{i \in B^u}{\operatorname{argmax}} \left[ \frac{\gamma(\beta_j) + b_i}{c(\beta_j) + \Delta_i^*} \right] \quad (32)$$

As can be seen, the right side of equation (32) above represents the ratio of the total bid price against the minimal possible asking price, if a bid i is added to the constructing trade j.

II. Two Pass Sequential Trade Building Method

The present invention has identified a probability that the routes j constructed for the later selected asks j by the above-described one-pass sequential trade building method may, in some instances, have less than optimal quality. More specifically, by the time the last routes are selected for matching, the remaining bids in $B^u$ may have wide geographical spacing. In addition, there may be a bias in the first selected asks j matching more bids i, i.e., having more customers, than later selected asks.

Figure 3A:
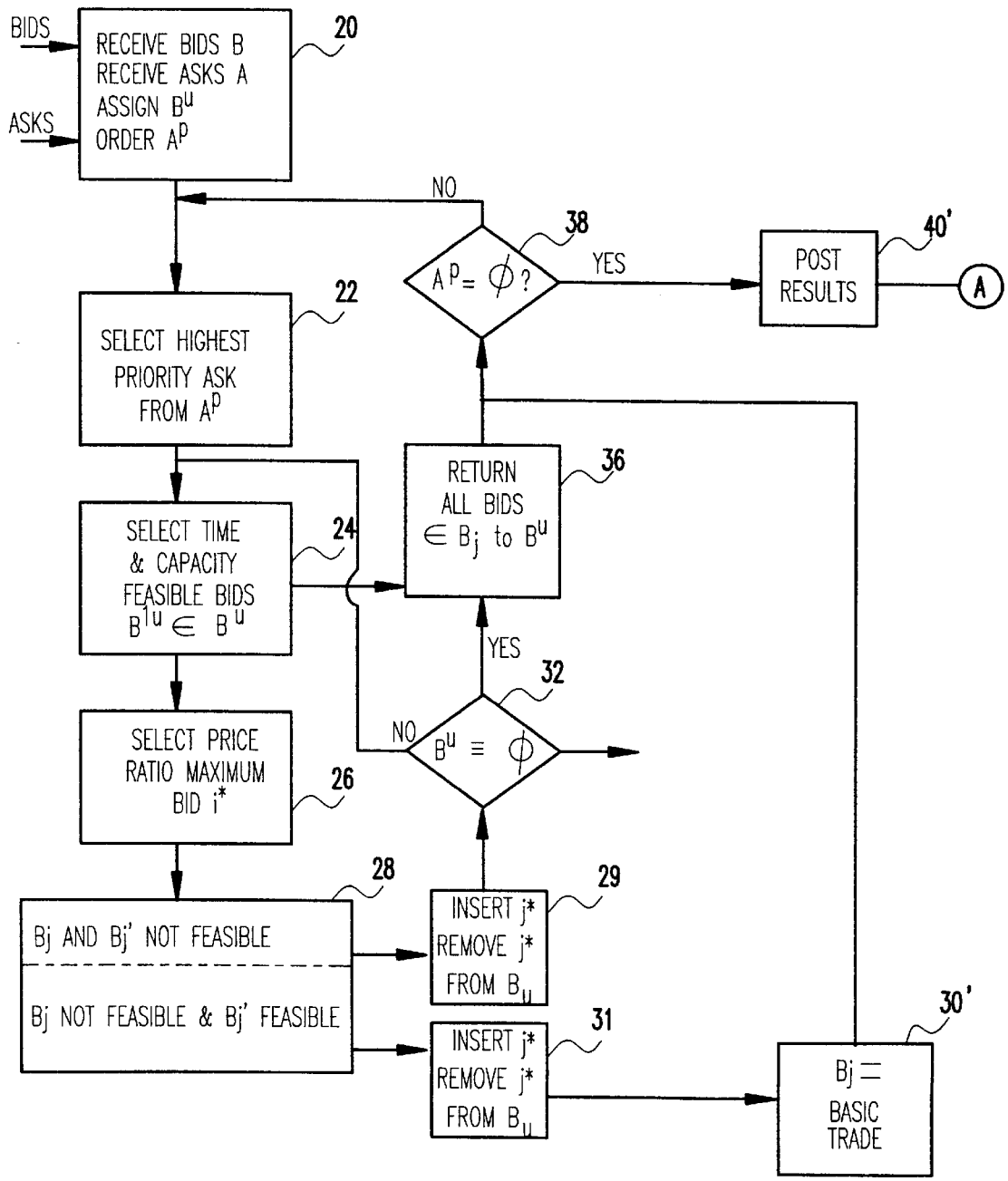
FIG. 3A is a functional block diagram of a first stage of a two-pass sequential trade building method according to the present invention.
Figure 3B:
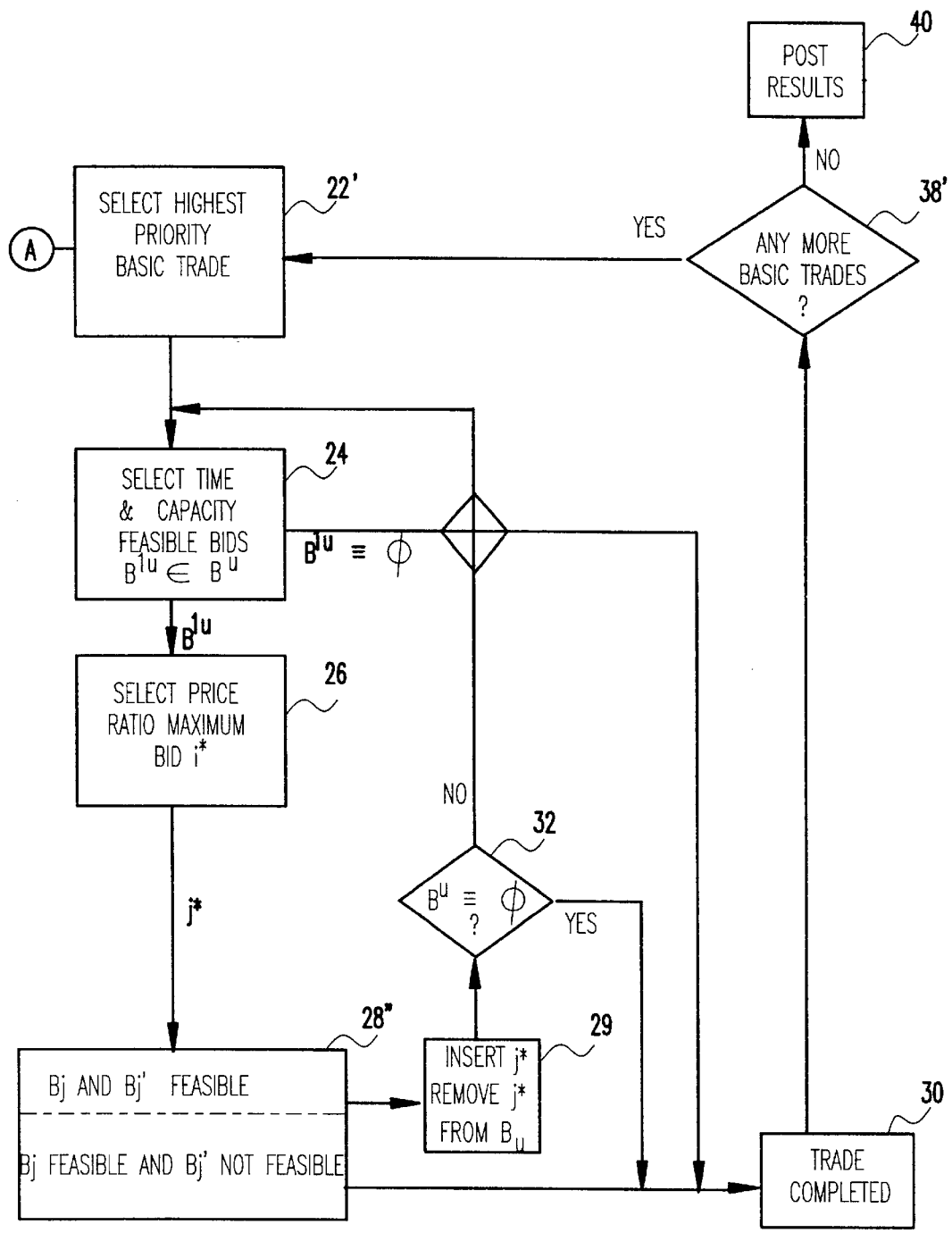
FIG. 3B is a functional block diagram of a second stage of the two-pass sequential trade building method having the FIG. 3A first stage.

Referring to FIGS. 3A and 3B, the present invention will describe a modification of the one-pass sequential trade building method, termed herein as the two-pass sequential trade building method or 2-PSTB, for alleviating these issues. A substantial portion of the second method is identical to the described first method and, accordingly, only the differences will be described. Like-numbered blocks, as between FIGS. 2 and FIGS. 3A and 3B, reference like functions.

The two-pass sequential trade building method consists of a first stage, an example of which is described referring to FIG. 3A, and a second stage, which is described in reference to FIG. 3B. Referring to FIG. 3A, the first stage is substantially similar identical to the one-pass sequential method except that constructing a trade j terminates as soon as the trade becomes price feasible,. i.e, upon the first bid i* insertion that renders $y(\beta_j')/c(\beta_j') \geq 1$. More specifically, block 20 arranges the asks in ascending order, block 22 selects the highest priority ask, block 24 calculates as a subset $B'_u$ all of the unmatched bids from $B^u$ that are time feasible and capacity feasible for insertion into the j route, and block 26 identifies the i* bid from $B'''$ which provides the maximum increase in the price ratio. However, block 28' differs from block 28 of FIG. 2, because it terminates the route building for the ask j as a "basic trade" upon the first bid i* that renders the trade price feasible, i.e., the first occurrence of comparative state (2), which is $y(\beta_j)/c(\beta_j) < \text{"1"}$ and $y(\beta_j')/c(\beta_j') \geq \text{"1"}$.

Therefore, for this embodiment until state (2) is met block 29 will insert the bid i*, go to block 32 to determine if there are any more unmatched bids B" and, if "yes", loop back to block 24, calculate a new set of time and capacity feasible bids B'''u, go to block 26 and identify the next candidate i*, and repeat the process repeats until the first detection of comparative state (2), or until step 24 does not generate any more qualified bids B''', whichever occurs first.

If the comparative state (2) terminates the loop the trade $B_j$ is termed identified as a "basic trade". If the trade $B_j$ is still not feasible when step 32 identifies no more bids B", or when step 24 generates no more qualified bids B''', a trade cannot be constructed from that ask. For either condition, block 36 re-assigns to the unmatched bid set B" all of the bids i that had been assigned to that ask j.

After the above-described loop of bid-inserting steps terminates, by block 30' or 36, the method determines at block 38 if there any asks j remaining in the ordered set $A^P$ and, if so, returns to block 22 and selects the next ask j from $A^P$ and builds a basic trade for that ask j or determines it infeasible as described above. This continues until block 38 determines that no asks remain in $A^P$. The first stage, or phase, of the second sequential trade building method is then completed at the termination point "A" of FIG. 3A.

Referring to FIG. 3B, the second phase of the two-pass sequential method then inserts bids from the remaining unmatched bids in B" into each of the basic trades constructed by the first phase until the trade is no longer price feasible or until there are no further unmatched time and capacity feasible bids for insertion.

More specifically, block 22' selects the highest priority basic trade, which is the highest price trade. Block 24 then constructs a sub-plurality B''' of bids that are time and capacity feasible bids from B", and block 26 selects the candidate i* which achieves the maximum increase in that basic trade's price ratio. The block 24 and 26 operation of identifying a candidate bid i* continues until one of three terminating conditions occurs. The first is block 32 determining that there are no more unmatched bids B" to insert. The second is block 24 determining that there are time and capacity feasible bids for insertion. The third is block 28" determining that insertion of the candidate bid i* would render the trade infeasible.

As shown by FIG. 3B, upon the first occurrence of either of these three conditions the method goes to step 30 which identifies the basic trade as completed, and then to block 38' to determine if there are any more basic trades. After all of the basic trades have been selected, and as many bids i* inserted into each until it becomes price infeasible or there are no more bids, the process goes to block 40 where the results are posted.

As can be seen, the first phase (FIG. 3A) of the two-pass sequential method matches at least one bid to as many asks as possible from $A^P$, while the second phase (FIG. 3B) inserts as many of the remaining bids as possible into each of the basic trades.

While the invention has been described in terms of its preferred embodiments, those skilled in the art will recognize that the invention can be practiced with modification within the spirit and scope of the appended claims. For example, the method can accommodate a carrier's desire to travel between two cities without any stops between. The accommodation is achieved by, for example, adjusting the ask time windows so that non-stop stop travel is the only option, and/or the ask price. In addition, the order and arrangement of the conditional branch and termination and blocks depicted in FIGS. 2, 3A, and 3B is for purposes of example only. Many variations are within the scope of this invention are readily seen by one of ordinary skill.

Having thus described our invention, what we claim as new and desire to secure by Letters Patent is as follows:

1. A method for receipt and double-auction heuristically-based matching a plurality of electronically posted bid records with a plurality of electronically posted ask records, comprising steps of:

(a) receiving said plurality of bid records and said plurality of ask records, each of said bid records including a price data and a plurality of bid attributes representing shipping performance requirements, and each of said ask records including an ask price data and a plurality of ask attributes representing shipping performance capabilities;

(b) selecting an ask record from said plurality of ask records;

(c) initializing a trade route data list, for insertion of bid records, corresponding to said selected ask record;

(d) selecting a candidate bid record from said plurality of bid records based on the bid attributes of the selected candidate bid record meeting a predetermined feasibility criteria relative to the ask attributes of said selected ask record and bid attributes of bid records inserted in said trade route data list, and based on a price/cost ratio improvement heuristic determined from the price data of said plurality of bid records, and the price data and attributes of said selected ask record and the price data and bid attributes of bid records inserted in said trade route data list;

(e) generating first true/false price feasibility value from the price data and attributes of said selected ask record and the price data and bid attributes of bid records inserted in said trade route data list based on a predetermined function, and a second true/false price feasibility value from the price data and attributes of said selected ask record, the price data and bid attributes of bid records inserted in said trade route data list, and said candidate bid record based on the same predetermined function;

(f) designating said trade route data list as completed in response to a comparative state of said first and second price feasibility values meeting a predetermined completion condition;

(g) inserting said candidate bid record into said trade route data list, and removing said inserted bid record from said plurality of bid records, in response to the comparative state of said first and second price feasibility values not meeting said predetermined completion condition;

(h) repeating said steps (e)–(g) until said trade route data list is designated as completed or until no bid records remain, whichever occurs first;

(m) designating said trade route data list as completed in response to said first and second price feasibility values meeting a predetermined price feasibility condition;

(n) replacing into said plurality of bids all bid records inserted into said trade route list in response to said first and second price feasibility values not meeting said predetermined price feasibility condition;

(o) repeating said steps (b) through (n), wherein step (b) selects an ask record not previously selected, until all ask records have been selected; and (p) generating a completed trade data representing all trade route lists designated as completed.

2. A method for receipt and double-auction heuristically-based matching a plurality of electronically posted bid records with a plurality of electronically posted ask records according to claim 1 wherein said step of selecting a candidate bid record includes the steps of:

selecting a sub-plurality of bid records from said plurality of bid records based on the bid attributes of the selected sub-plurality of bid records meeting said predetermined performance feasibility criterion relative to the ask attributes of said selected ask record and bid attributes of bid records inserted in said trade route data list; and selecting a candidate bid record from said selected sub-plurality of bid records based on said price/cost ratio improvement heuristic determined from the price data of said sub-plurality of bid records and the price data and attributes of said selected ask record and the price data and bid attributes of bid records inserted in said trade route data list.

3. A method for receipt and double-auction heuristically-based matching a plurality of electronically posted bid records with a plurality of electronically posted ask records according to claim 1 wherein said step of selecting an ask record selects said ask records in an ascending order according to the ask price data.

4. A method for receipt and double-auction heuristically-based matching a plurality of electronically posted bid records with a plurality of electronically posted ask records, comprising steps of:

(a) receiving said plurality of bid records and said plurality of ask records, each of said bid records including a price data and a plurality of bid attributes representing shipping performance requirements, and each of said ask records including an ask price data and a plurality of ask attributes representing shipping performance capabilities;

(b) selecting an ask record from said plurality of ask records;

(c) initializing a basic trade route data list corresponding to said selected ask record;

(d) selecting a candidate bid record from said plurality of bid records based on the bid attributes of the selected candidate bid record meeting a predetermined feasibility criteria relative to the ask attributes of said selected ask record and bid attributes of bid records inserted in said basic trade route data list, and based on a price/cost ratio improvement heuristic determined from the price data of said plurality of bid records, and the price data and attributes of said selected ask record and the price data and bid attributes of bid records inserted in said basic trade route data list;

(e) generating a first true/false price feasibility value from the price data and attributes of said selected ask record and the price data and bid attributes of bid records inserted in said basic trade route data list based on a predetermined function and a second true/false price feasibility value from the price data and attributes of said selected ask record, the price data and bid attributes of bid records inserted in said basic trade route data list, and said candidate bid record based on the same predetermined function;

(f) inserting said candidate bid record into said basic trade route data list;

(g) designating said basic trade route data list as a basic trade record in response to a comparative state of said first and second price feasibility values meeting a predetermined basic trade completion condition;

(h) repeating said steps (e)–(g) until said basic trade route data list is designated as a basic trade record or until no bid records remain, whichever occurs first;

(i) replacing into said plurality of bids all bid records inserted into said basic trade route list in response to said trade route data list not being designated as a basic trade record;

(j) repeating said steps (b) through (i), wherein step (b) selects an ask record not previously selected, until all ask records have been selected; and (k) generating a basic trade data representing all basic trade route lists designated as a basic trade record.

5. A method for receipt and double-auction heuristically-based matching a plurality of electronically posted bid records with a plurality of electronically posted ask records according to claim 4, further comprising steps of:

(l) selecting a basic trade record from said plurality of basic trade records;

(m) selecting a candidate bid record from said plurality of bid records based on the attributes of the selected candidate bid record meeting a predetermined feasibility criteria relative to said selected basic trade record and based on a price/cost ratio improvement heuristic determined from the price data of said plurality of bid records and said selected basic trade record;

(n) generating a third true/false price feasibility value from said basic trade record and said candidate bid record based on said predetermined function;

(o) inserting said candidate bid record into said trade route data list, and removing said inserted bid record from said plurality of bid records, in response to said third price feasibility value not meeting a second predetermined completion condition;

(p) repeating said steps (m)–(o) until said third price feasibility value meets said second predetermined completion condition or until no bid records remain, whichever occurs first;

(q) designating said basic trade record as completed;

(r) repeating said steps (1) through (q), wherein step (1) selects a basic trade record not previously selected, until all basic trade records have been selected and designated as completed; and (s) generating a completed trade data representing all trade route lists designated as completed.

6. A method for receipt and double-auction heuristically-based matching a plurality of electronically posted bid records with a plurality of electronically posted ask records according to claim 4 wherein said step (d) of selecting a candidate bid record includes the steps of:

selecting a sub-plurality of bid records from said plurality of bid records based on the bid attributes of the selected sub-plurality of bid records meeting said predetermined performance feasibility criterion relative to the ask attributes of said selected ask record and bid attributes of bid records inserted in said trade route data list; and selecting a candidate bid record from said selected sub-plurality of bid records based on said price/cost ratio improvement heuristic determined from the price data of said sub-plurality of bid records and the price data and attributes of said selected ask record and the price data and bid attributes of bid records inserted in said trade route data list.

7. A method for receipt and double-auction heuristically-based matching a plurality of electronically posted bid records with a plurality of electronically posted ask records according to claim 4 wherein said step of selecting an ask record selects said ask records in an ascending order according to the ask price data.

8. A method for receipt and double-auction heuristically-based matching a plurality of electronically posted bid records with a plurality of electronically posted ask records according to claim 6 wherein said step (m) of selecting a candidate bid record includes the steps of:

selecting a sub-plurality of bid records from said plurality of bid records based on the bid attributes of the selected sub-plurality of bid records meeting said predetermined performance feasibility criterion relative to said basic trade record; and selecting a candidate bid record from said selected sub-plurality of bid records based on said price/cost ratio improvement heuristic determined from the price data of said sub-plurality of bid records and said basic trade record.

* * * * *